Patented May 26, 1942

2,284,091

UNITED STATES PATENT OFFICE 2,284,091

PHONOGRAPH RECORD

James H. Hunter, Lansdowne, Pa., assignor to Radio Corporation of America, a corporation of Delaware No Drawing. Application May 31, 1938, Serial No. 211,082

5 Claims. (Cl. 106—37)

This invention relates to phonograph records, and more particularly to a method of preparing a composition of matter especially fit for use in the manufacture of such records.

It has long been recognized in the resin record industry that shellac is a very suitable material for the manufacture of phonograph records. It has also been found that proteins, and particularly protein derived from corn, imparts to shellac records the properties of toughness and improved strength. In order, however, to incorporate the corn protein into the shellac according to methods heretofore known, it has been necessary to resort to excessive and prolonged heating, and this tends to cancel out the advantages to be gained by the use of corn protein.

The primary object of my present invention is to provide a novel method of incorporating protein into shellac, which method will be free from the difficulties characteristic of prior art methods.

More specifically, it is an object of my present invention to provide an improved method of making corn protein compatible with shellac so as to impart to the shellac considerable strength and toughness, without, however, deleteriously affecting any of its other properties.

Another object of my present invention is to provide an improved method as aforesaid which may be easily carried out and which is inexpensive.

In accordance with my present invention, I first incorporate the protein into a synthetic resin known commercially as "Vinsol," and then combine the protein-"Vinsol" mixture with the shellac. By first mixing the protein with "Vinsol," or dissolving the protein in molten "Vinsol," I have found that it is readily possible to introduce the protein into the shellac without excessive or prolonged heating.

The protein is preferably derived by treating with alcohol the gluten meal which is the residue remaining after treating corn to remove the starch and oil therefrom, while the "Vinsol" resin is an extract from long leaf yellow pine tree stumps. In preparing the "Vinsol" resin, the stumps are disintegrated or shredded and the shredded material is extracted in large heated cylinders by means of a solvent such as benzol or some other suitable aromatic-hydrocarbon. The solvent extracts the "Vinsol" resin along with the rosin, turpentine, pine oil and miscellaneous other materials from the shredded stumps, after which the liquid is subjected to a distillation process. In the distilling cycle, the solvent is the first material to be removed, followed by the turpentine and finally the pine oil, a residue consisting of rosin and "Vinsol" remaining in the still. The molten resin is then run into a hot mixture of gasolene and furfural, and the rosin dissolves in the gasolene while the "Vinsol" dissolves in the furfural. The mixture is then allowed to stand and settle until two liquid layers have formed, one consisting of gasolene and rosin, and the other consisting of "Vinsol" and furfural. The latter layer is then run through a continuous still whereby the furfural is removed, and the "Vinsol" resin comes out in a hot molten state, being run into sheet metal conainers and distributed therein in the market.

The exact chemical composition of the "Vinsol" resin is not definitely known. It has been ascertained, however, that the "Vinsol" resin consists essentially of a highly oxidized form of abietic acid, and much smaller proportions of resin acids, polyphenols, ligneous materials, and unoxidized abietic acid.

To make the corn protein compatible with the shellac so that it may be easily introduced therein, the protein may first be dissolved in molten "Vinsol," or the protein may be incorporated into the "Vinsol" on heated rolls. After the protein and "Vinsol" have been thoroughly united, the resulting material may be incorporated into the shellac by working the materials on heated rolls. It is not, however, necessary to apply excessive or prolonged heating, and consequently all of the advantages to be gained by the incorporation of corn protein in the shellac are retained.

In practice, I have found that the amount of corn protein which may be incorporated into the shellac in this manner varies over wide limits, and a protein content of approximately 20 per cent by weight has been found to give very satisfactory results. Any suitable method of first combining the protein with the "Vinsol" resin may be employed, and the two set forth above are merely intended by way of illustration. In any event, I desire it to be understood that my invention shall not be limited except insofar as is made necessary by the prior art and by the spirit of the appended claims.

I claim as my invention:

1. The method of incorporating into shellac protein derived from corn which comprises first incorporating the protein into a resinous composition consisting essentially of oxidized abietic acid, and then incorporating the product of said first incorporation into the shellac.

2. The method set forth in claim 1 characterized in that said resinous composition is an extract derived from long leaf yellow pine trees.

3. The method of incorporating into shellac protein derived from corn which comprises first dissolving the protein in a molten resinous composition consisting essentially of oxidized abietic acid, and subsequently mixing the resulting material with the shellac.

4. The method of incorporating into shellac protein derived from corn which comprises first thoroughly mixing the protein with a resinous composition consisting essentially of oxidized abietic acid, and subsequently thoroughly mixing the resulting mixture with the shellac.

5. The method set forth in claim 4 characterized in that both said mixing operations are carried out on heated rollers.

JAMES H. HUNTER.